United States Patent [19]

Gradoboev et al.

[11] Patent Number: 4,944,382
[45] Date of Patent: Jul. 31, 1990

[54] APPARATUS FOR ORIENTING PARTS IN FEEDING DEVICES OF VARIOUS UNITS

[76] Inventors: Vladimir T. Gradoboev, ulitsa Kropotkina, 120/1, kv. 86; Leonid I. Melnikov, ulitsa Dm.Donskogo, 19, kv. 19; Alexandr M. Klimenov, Nevelskogo, 5, kv. 45; Alexandr E. Sitnikov, ulitsa Leskova, 250, kv. 39, all of Novosibirsk, U.S.S.R.

[21] Appl. No.: 43,847

[22] Filed: Apr. 29, 1987

Related U.S. Application Data

[63] Continuation-in-part of Ser. No. 933,813 filed Nov. 24, 1986, abandoned, which is a continuation of Ser. No. 763,720 filed as PCT SU 84/00053 on Oct. 1, 1984 published as WO 85/01719 on Apr. 25, 1985, abandoned.

[30] Foreign Application Priority Data

Oct. 18, 1983 [SU] U.S.S.R. ................. 3667922

[51] Int. Cl.$^5$ ............................................. B65G 47/24
[52] U.S. Cl. ............................................. 198/399
[58] Field of Search ............... 198/383, 396, 398, 399, 198/394, 416, 455; 221/171, 173

[56] References Cited

U.S. PATENT DOCUMENTS 2,336,606 12/1943 Everett ........................... 198/396 X
2,515,404 7/1950 Grosvenor ..................... 198/670 X
3,221,857 12/1965 Keller ............................. 198/455 X
3,797,640 3/1974 Aidlin et al. .................... 198/453 X

FOREIGN PATENT DOCUMENTS 1188063 10/1985 U.S.S.R. .

Primary Examiner—Robert J. Spar
Assistant Examiner—Cheryl L. Gastineau
Attorney, Agent, or Firm—Lilling and Greenspan

[57] ABSTRACT

A distinguishing feature of an apparatus for orienting parts resides in the provision of members for picking-up improperly oriented parts in the form of identifying and limiting cams and of a reorienter which are located in a gap in guide and confining members which are offset downstream the gap in the direction of rotation of a vertically extending screw conveyor, the picking-up members being mounted in such a manner that the parts being oriented which have asymmetrical surface configuration with respect to a plane drawn through the middle thereof, at right angles to the axes thereof, and which are fed in improperly oriented position are engaged by these picking-up members, whereas the parts which are properly oriented are caused to pass by the reorienter.

3 Claims, 8 Drawing Sheets

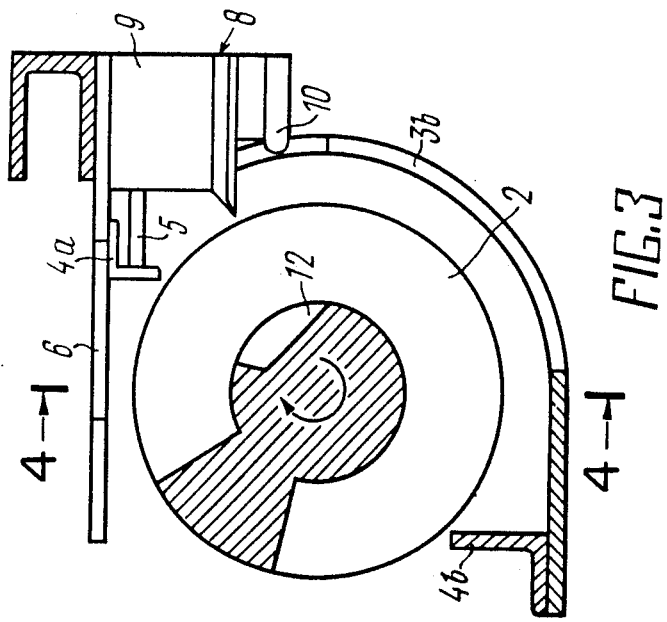
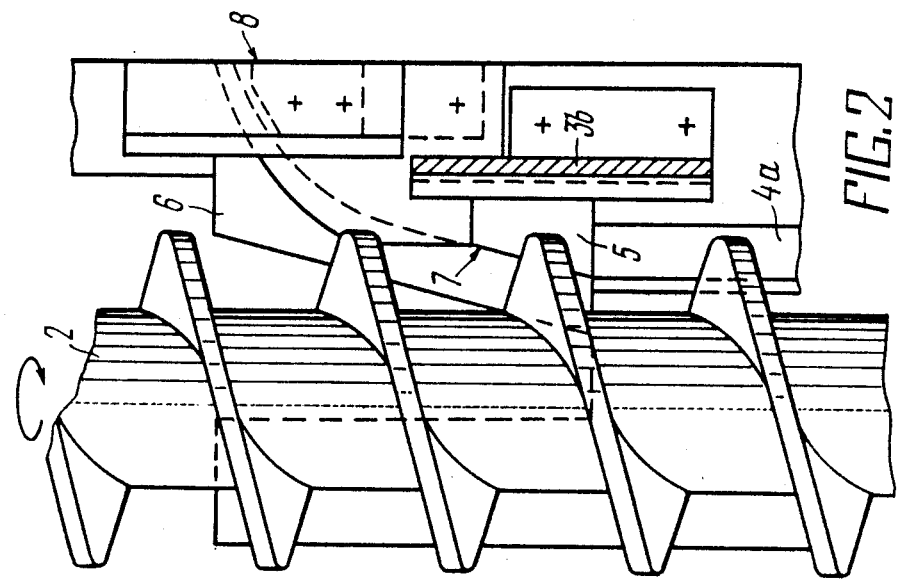

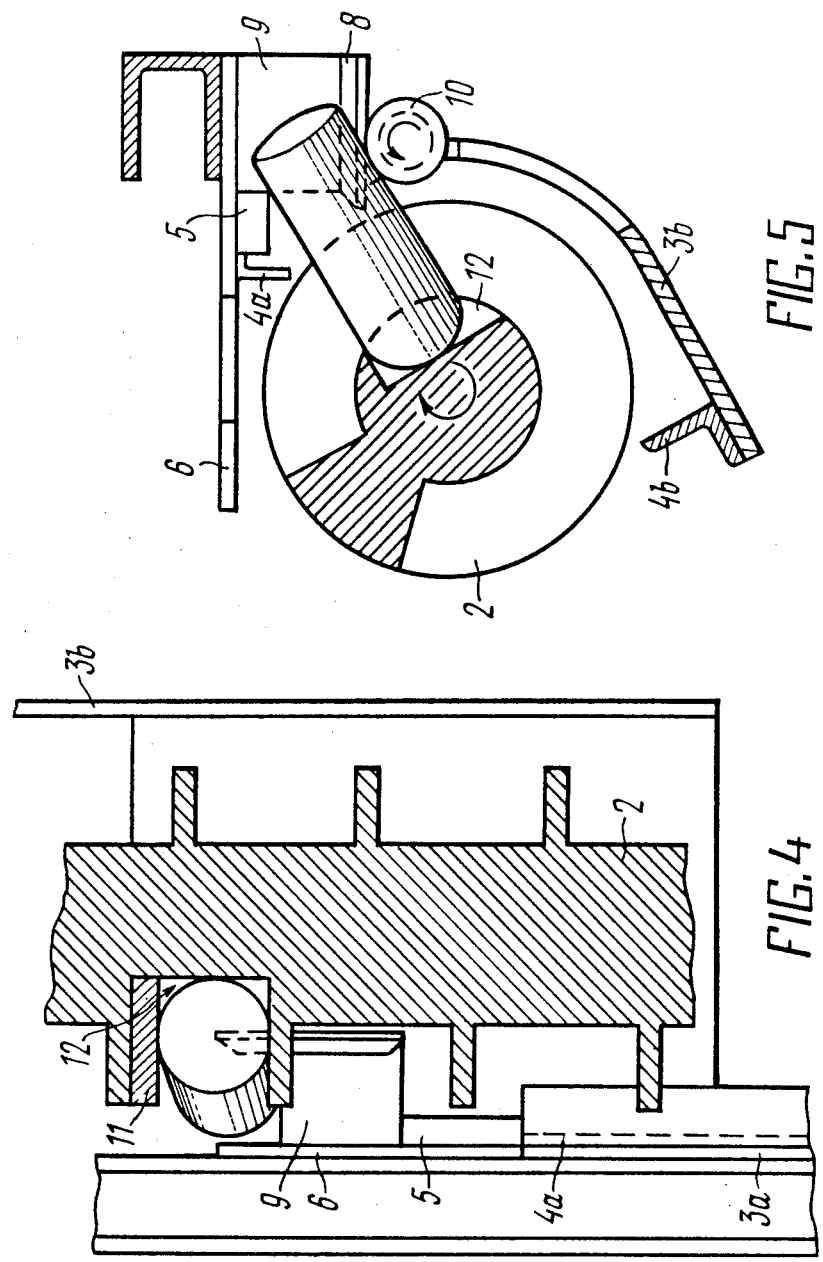

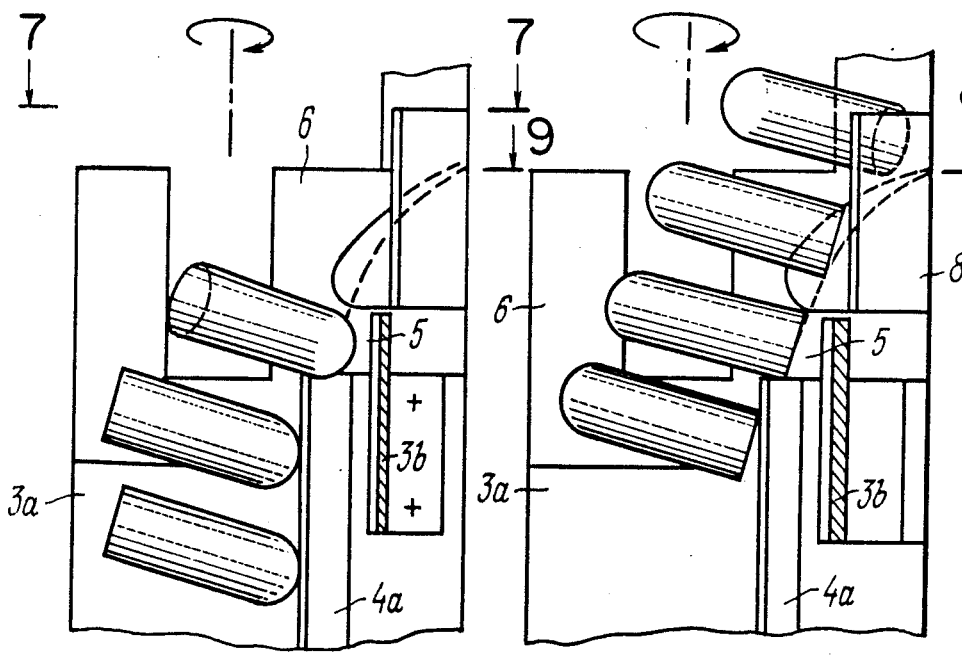
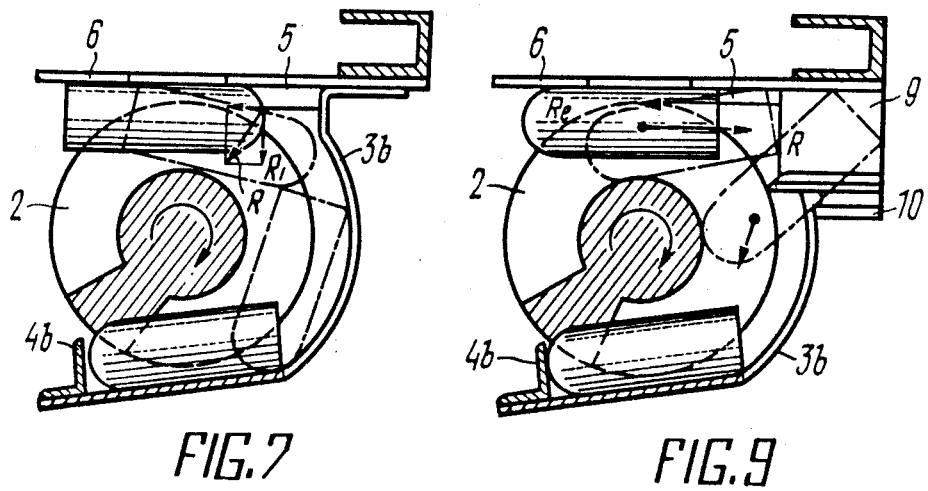

▲ Correctly oriented
△ Incorrectly oriented

APPARATUS FOR ORIENTING PARTS IN FEEDING DEVICES OF VARIOUS UNITS

CROSS-REFERENCE TO RELATED APPLICATIONS

This invention is a continuation-in-part of U.S. patent application Ser. No. 933,813 filed on Nov. 24, 1986 which was continuation of U.S. patent application Ser. No. 763,720 filed as PCT SU84/00053 on Oct. 1, 1984, published as WO85/01719 on Apr. 25, 1985, both prior applications being abandoned.

BACKGROUND OF THE INVENTION

1. Field of the Invention

This invention relates to handlign equipment, and more specifically, it deals with apparatuses for orienting parts such as asymmetrical bodies of revolution in feeding devices of various units during handling.

2. Description of the Prior Art

When parts are fed from a pile to workstation of production machines, it is necessary to impart to the parts being fed a predetermined orientation in space which is required to carry out their process handling.

The process of orienting consists in bringing all parts into a predetermined position. This process consists, in its turn, of two consecutive operationa. First, the position of a part is identified, and the part is turned to bring it into properly oriented position.

Structural features of a part shape (presence of a hole, groove, shoulder, flange, spherical end face, and the like) or an offset position of the center of gravity with respect to the end face of a part are used to identify position of parts.

Those features of part surface which are chosen as identification elements are orientation features.

The parts position is determined in orienting apparatuses having members which are configured in such a manner as to conform to the shape of identification features. Subsequent turning of parts into properly oriented position in prior art feeding devices is carried out at the moment of picking them up from the pile or during feeding or transfer into a trough of a unit.

An apparatus for orienting cylindrical caps is known in the art (N.I. Kamyshny, Avtomatizatsiya zagruzki Stankov, 1977, Mashinostroenie Publishing House, Moscow). p. 51). Caps are fed only-by-one from a trough to a screw. If the caps face with their opening down, they are put on the screw and are then overturned and fall down into the trough with the bottom down. If the cap falls down on the screw with its bottom, it will recoil upwards and then fall down into the trough in the former position, i.e. with the bottom down. Therefore, all caps fed to the trough will be oriented with the bottom down.

The same technique is used for orienting products in a packing machines (FR, B, 2251483).

These apparatuses are deficient in that a free falling part has a large degree of freedom which may result in the part being fed to a unit in a non-oriented position.

Another disadvantage is that an improperly oriented part is to be turned through an angle greater than 90° in a vertical plane for bringing it from one position to another so that spacing the parts should be greater than two times their length thus lowering throughout capacity.

An apparatus for feeding corks is known (U. S. Pat. No. 2336606).

This apparatus is deficient in that a limited range of products can be oriented.

In fact, this Everett's apparatus is designed for orienting bodies with a simple surface configuration such as corks, which are capable of interacting with orienting members of a conveyor.

At the same time, parts having an intricately shaped surface such as those having end face projections, drilled holes, grooves, flanges, tapering portions, and the like on their cylindrical surfaces cannot interact as desired.

In addition, all parts must move along one side of the conveyor in the Everett's apparatus and pass through all orienting zones. As a result, properly oriented parts will come in contact with control members in all zones and loose stability. In the prior art apparatus, parts always have three degrees of freedom which lowers their stability during orienting. All this results in an adequate reliability of the apparatus.

An apparatus for orienting parts having a convex surface is also known (SU, A, 718332).

The apparatus comprises a conveyor consisting of guide member with a slot accommodating a screw, the turns of the screw protruding from the slot to an amount equal to the depth of a part recess, the screw pitch and diameter corresponding to the width of the recess.

This prior art apparatus is deficient in a low throughput capacity improperly oriented parts are removed from the conveyor during operation, In addition, the same parts are repeatedly loaded in a non-oriented position and then rejected back into a hopper so that part surfaces are damaged.

SUMMARY OF THE INVENTION

It is the main object of the invention to provide an apparatus for orienting parts such as bodies of revolution which are asymmetrical with respect of a plane drawn through the middle thereof, at right angles to the axis of the body.

Another object of the invention is to improve sensitivity of the apparatus to the position of parts being oriented.

Still another object of the invention is to improve throughout capacity and reliability of turning of non-oriented parts into a properly oriented position.

Further object of the invention is to enlarge the range of parts that can be oriented.

These and other objects are accomplished by that in an apparatus for orienting parts in feeding devices of various units, comprising a feeding hopper for parts to be fed to a working member which is in the form of a screw conveyor having a guide member and confining member for maintaining parts in a pre-set position during feeding, according to the invention there are provided members for picking -up improperly oriented parts in the form of an identifying cam and a control cam and a reorienting means which are disposed in a gap in said guide and confining members and which are offset downstream the gap in the direction of rotation of the vertically extending screw conveyor, said picking-up members being mounted in such a manner that the parts being oriented, which have an asymmetrical surface configuration with respect to a plane drawn through the middle thereof, at right angles to their axes and which are fed in improperly oriented position, will be engaged by these members and caused to turn into a pre-set position in the reorienting menas, and parts which are in properly oriented position will pass by the reorienting means.

The identifying and control cams are preferably mounted as an extension of the guide and confining members, the surfaces thereof facing towards the screw conveyor being provided with projections which are engageable with improperly oriented part.

In addition, the reorienting means is preferably made in the form of a passage extending along a tangent line to the surface of the screw conveyor and a guide column mounted adjacent to the screw conveyor, dimensions of a space defined between the surfaces of the turns of the screw conveyor in the zone of this passage corresponding to dimensions of the parts being oriented.

This design of an apparatus for orienting parts in feeding devices of various units makes it possible to enlarge the range of parts that can be oriented and also to improve throughput capacity and reliablity of orientation thus enhancing manufacturing capabilities of the apparatus.

The invention essentially resides in the following.

The use of the members for picking-up improperly oriented parts, which is in the form of an identifying cam and a control cam, makes it possible to pick-up from the general flow of parts those parts only that are not properly oriented and to change their itinerary so as to feed them to the reorienting means.

For making choice of structural form of these members, and to ensure their correct cooperation with the parts being orientated, it is necessary to study configuration of the parts so as to determine particular features of their surface. Such features may include spherical, conical or other end faces, grooves, shoulders and chamfers on the generant surface, and the like.

It should be noted that any particular feature of a part surface should be, as a rule, offset with respect to a plane drawn through the middle of the part, at right angles to its axis. Such parts can be regarded as asymmetrical. It is not necessary to orient symmetrical parts since they will have one and the same shape of the surface in any position.

Therefore, having thus determined a particular feature of a part shape and chosen it as the orientation feature, all parts fed to the orienting apparatus may be divided in accordance with this feature into two groups: properly oriented parts and improperly oriented parts.

Based on the properly and improperly oriented positions of parts, and also in accordance with the chosen features of their surface configuration, projections are provided on respective surfaces of the identifying and control cams to engage the parts being oriented.

The position and configuration of the projections are based on the condition that when a properly oriented part comes in contact therewith, the projections will not engage the part so that such part will pass by the reorienting means. And, on the contrary, when coming in contact with an improperly oriented part, the projections will engage the same and will change the direction of its movement with respect to the path of movement of properly oriented parts so as to direct this part towards the reorienting means.

In the reorienting means all parts fed thereto are turned to take a reversed position. The provision of the passage and column makes it possible to replace full U-turn of a part by two motions: reciprocation and a turn at 90°. As a result, dynamic loads during turning of parts are lowered so as to allow the orienting speed to be raised.

The provision of a space defined between surfaces of the turns of the screw conveyor in the passage zone which has dimensions corresponding to dimensions of a part being oriented makes it possible to reduce the stroke of reciprocation of a part within the passage and enhances reliability of its engagement with the screw during the turning. At the same time, an improvement of reliability of turning and reduction of the stroke of reciprocation will further enhance reliability and throughout capacity of orientation.

Location of the members for picking-up improperly oriented parts in reorienting means in the gap in the confining and guide members and their offset downstream the gap in the direction of rotation of the screw allows parts which are properly oriented and which have passed through these members to move horizontally through an additional distance which is equal to the amount of the offset of the guide member thus bypassing the reorienting means.

The distinguishing feature of this orienting apparatus resides in a division between logical functions associated with the determination of position of incoming parts and selective change in their path of movement if necessary and functions consisting of a purely mechanical action upon the parts aimed at turning them into the reversed position.

As a result, on the one hand, the sensitivity of the orienting apparatus to the particular features of external configuration of parts is improved thus enlarging its manufacturing capabilities and bringing solution to the problems of oriented loading of parts having configurations that cannot be oriented using prior art equipment.

On the other hand, a strict adjustment to dimensional parameters of the reorienting means for turning all incoming parts makes it possible to improve reliability and speed of the orientation operation which enhances throughput capacity and operability of the apparatus.

BRIEF DESCRIPTION OF THE DRAWINGS

The invention will now be described with reference to specific embodiments illustrated in the accompanying drawings, in which:

FIG. 2 is a detail A in FIG. 1;

FIG. 3 is a sectional view taken along line 3—3 in FIG. 1;

FIG. 4 is a sectional view taken along line 4—4 in FIG. 3;

FIG. 5 an embodiment of a guide column of a reorienting means;

FIG. 6 shows a path of movement of a part with a spherical bottom which is properly oriented;

FIG. 7 is a sectional view taken along line 7—7 in FIG. 6;

FIG. 8 shows a path of movement of a part with spherical bottom which is improperly oriented;

FIG. 9 is a sectional view taken along line 9—9 in FIG. 8;

An apparatus for orienting parts in feeder devices of various units according to the invention, preferably for orienting parts such as bodies of revolution asymmetrical with respect to a plane drawn through the middle thereof, at right angles to the axis of the body is used, e.g. for sleeve-type parts with a bottom having a spherical or planar shape, and for conical parts, parts with shoulders, chamfers, and the like.

DESCRIPTIQN OF THE PREFERRED EMBDODIMENT

Figure 1:
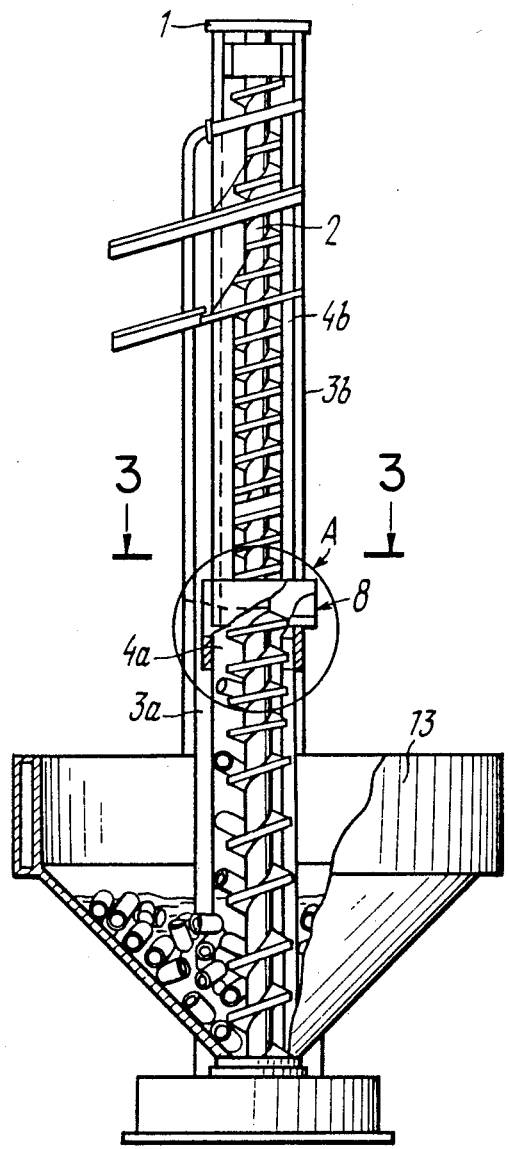
FIG. 1 is a general view of an apparatus for orienting parts in feeder devices of various units according to the invention.

An apparatus (FIG. 1,2) comprises a means for feeding parts which is in the form of a vertically extending screw conveyor 1 having a screw 2 and a confining member 3a and a guide member 4a extending therealong which have a gap therein and which are offset in the direction of rotation of the screw conveyor 1, the confining and guide members being shown at 3b and 4b, respectively, downstream the opening. Depending on the angle of the offset, the transition portion between the confining members 3a and 3b (FIG. 3) may have a curvelinear surface with a radius corresponding to the path of movement of parts within the gap zone.

According to the invention, members designed for picking-up improperly oriented parts in the form of an identifying cam 5 and a control cam 6 are provided in the gap zone. The identifying cam 5 and the control cam 6 are provided as extensions of the confining member 3a and guide member 4a and their surfaces which face towards the screw conveyor 1 are provided with projections which are engageable with improperly oriented parts.

Depending on the part length, an opening may be made in the surface of the control cam so as to allow parts to turn in the zone of the identifying cam and reorienting means 8.

The reorienting means is located immediately adjacent to the identifying cam 5 and comprises a passage 9 extending along a tangent line to the surface of the screw conveyor 1. A guide column 10 (FIGS. 3 through 5) is provided in the proximity to the passage 9, in the direction of rotation of the screw 2. Dimensions of a spaced defined between surfaces of the turns of the screw covneyor 1 in the zone of the passage 9 correspond to dimensions of the parts being oriented. In other words, the distance between the adjacent surfaces of the screw 2 in this zone is reduced by means of straps 11 so as to make it as close as possible to the diameter of the part. A recess 12 is provided in the shaft of the screw 2 so as to reduce the stroke of reciprocation of the part which is moved to properly oriented position.

The apparatus also has a feeding hopper 13 (FIG. 1) having its base so shaped as to ensure continuous feeding of parts to the screw conveyor 1.

The orienting apparatus according to the invention functions in the following manner.

Parts loaded into the hopper 13 are fed during rotation of the screw 2 by a drive (not shown in the drawings) into the interturn space of the screw and conveyed towards members for picking-up improperly oriented parts.

The parts may take two positions in the turns of the screw conveyor 1: a properly oriented position in which the part is in contact with the guide member 4a with one end face thereof and an improperly oriented position in which the part is in contact with the guide member 4a with the opposite end face thereof.

The parts are fed by the screw conveyor 1 upwardly to the gap in the guide and confining members. In the gap zone, the parts move either onto the edge of the identifying cam 5 or onto the projections 7 of the control cam 6. The cams 5 and 6 are mounted for selectively engaging a certain portion of the part surface.

These portions coming in contact with the identifying cam 5 or with the projections 7 of the control cam 6 are carriers of information on the position of the part. Generally they are certain features of the part surface configuration characterizing its asymmetrical shape with respect to a plane drawn through the middle of the part, at right angles to the axis thereof.

With an asymmetrical shape of a part, the halves thereof will have different features located either on end faces of on the generant surface. They may be in the form a sphere or an opening at one end as well as grooves and shoulders on the generant surface which are offset with respect to the middle of the part, and the like.

Therefore, having thus determined shape features of a part and taken them as orientation features, one can impart a respective configuration to the identifying cam 5 and provide the projections 7 on the surface of the control cam 6 in an appropriate manner.

As a result of the choice of configuration of the identifying and control cams 5 and 6, only parts which are improperly oriented will be picked-up from the general flow of parts coming to the orienting apparatus. This process occurs because properly oriented parts will not be engaged by the identifying and control cams 5 and 6 so that they will pass by the reorienting means 8, whereas parts that are not properly oriented will be engaged by the abovementioned cams which will direct them towards the reorienting means.

For example, to pick-up improperly oriented cylindrical parts having a spherical bottom (FIG. 6, 7, 8, 9)

from the general flow and direct them to the reorienting means, the identifying cam 5 is made in the form of a plate having its working edge offset in the direction towards the control cam 6.

As a result of this offset position, a part which will move its spherical end facing towards the edge of the control cam 5 (properly oriented part) will come in contact therewith with the periphery of the spherical portion rather than with the center thereof so that a reaction force $R_1$ (FIG. 7) will develop at the point of contact, which will directed towards the screw conveyor 1. This reaction force will cause the spherical portion of the part to slide away from the edge of the identitying cam, and the part will be placed on the surface of a turn of the screw conveyor to pass below the reorienting means and then it will come in contact with the guide member 4b to be fed by the screw conveyor further upwardly.

In order to improve reliability of movement of the spherical portion of the part away from the edge of the identifying cam 5, the latter is mounted with a certain offset with respect to the guide member 4a so as to form a step (FIG. 2, 6, 8).

When a part moves from the guide member 4a to the edge of the identifying cam 5, it travels through the distance equal to the size of the step while turning synchronously with the screw 2. As a result of this turn at a certain angle, the spherical portion of the part will be given an additional offset with respect to the edge of the identifying cam 5 thus increasing the force of reaction $R_1$ at the point of contact with the edge and improving conditions for the part to slide Unlike the properly oriented part, a part which is not properly oriented will move towards the edge of the identifying cam with its opposite end having an opening or a planar surface facing towards the cam. In this case, upon engagement thereof with the edge offset towards the control cam, a reaction force $R_2$ (FIG. 9) will act along the axis of the part so as to prevent it from sliding away from the edge. The part, which is engaged by the edge of the identifying cam 5 rather than by the guide member 4a, will continue to move upwardly and will enter the passage 9 of the reorienting means 8 (FIGS. 8, 9).

All parts entering the passage 9 of the reorienting means 8 will be turned through 180°. This U-turn process is carried out in combination with reciprocation of the part in the passage 9 so as to reduce the angle of turn in 90°.

In fact, the parts admitted to the passage 9 will first be moved out from the interturn space of the screw 2 to slide over the bottom part of the passage.

In order to ensure smooth movement of the part, the bottom of the passage is curvilinear in accordance with the path of movement of the incoming parts.

This movement of the part out of the screw continues until the rear portion of the part, which is supported by the screw shaft, will become unsupported, i.e. until it disengages from the shaft. At this moment the rear portion of the part (its spherical surface) will start moving synchronously with the surface of the screw turn and will entrain the whole part so as to cause it to turn within the passage 9. Concurrently with turning, the part will be drawn back into the interturn space of the screw.

During the turning, the guide column 10, which is disposed immediately adjacent to the passage 9, will provide an additional support for the part so as to prevent it from falling out of the screw while increasing speed and smoothness of the turning process.

continuing its turning and rolling with its periphery over the guide column 10, the part will be completely drawn back into the interturn space of the screw 2 and will continue its advance on the surface of the screw to come in contact with the confining member 3b and guide member 4b.

As the whole process of turning takes place without loss of contact between the part and the surface of the screw turn the part will not disengage from the screw and will not change its position in the general flow of parts moving in the screw conveyor 1. Thus, having come in contact with said confining and guide members, the reoriented part will join the flow of parts which have been in properly oriented position and have bypassed the reorienting means 8 to take its former place in the general flow of parts.

Therefore, after all steps of interaction of the oriented apparatus with a improperly oriented part, including picking-up a given part from the general flow by means of the identifying and control cams 5 and 6, directing it to the reorienting means and further turning it in combination with reciprocation and subsequently moving the reoriented part back to the general flow are completed, the process of orientation of the given part is over.

To enhance the action of the screw 2 aimed at turning the part and drawing it back from the passage 9 into the interturn space, the space between surfaces of the turns in this zone is narrowed by porviding a strap 11 (FIG. 4). The thickness of the strap 11 is chosen in such a manner as to provide the size of the interturn space which is equal to, or slightly greater than, the diameter of the part being turned.

As a result, during turning and moving of the part back into the interturn space, the screw will better engage the part surface so as to prevent it from slipping with respect to the screw surface during turning and drawing back thus increasing the speed and improving reliability of reorienting process.

In addition, to reduce the distance through which the part is moved out into the passage 9 during reorientation, it is preferred to provide in the shaft of the screw, in the zone of said passage, a recess 12 (FIGS. 4 and 5). In this case, when the part is moved out into the passage 9, its rear portion which comes level with the recess 12, will disengage from the shaft of the screw faster. The loss of contact will at once result in turning of the part about the guide column 10 and in drawing it back into the interturn space of the screw. It is important that configuration of the recess 12 contributes to the turning of the part by acting thereupon with its lateral surface.

The provision of the recess 12 in the shaft of the screw will increase speed and improve reliability of turnilng and will favourably affect reorientation.

The orientilng apparatus according to the invention may be used not only for parts having a spherical surface at one end as described above, but it can also be used for orienting sleeve-type parts.

A distinguishing feature of such parts is an opening at one end thereof and a flat bottom at the other end.

By taking the opening as the orientation feature one can assume that parts fed by the screw conveyor 1 with their bottom facing towards the guide member 4a are properly oriented. And, on the contrary, parts having their openings facing towards said guide member will be regarded as improperly oriented.

This representation of the oriented and non-oriented position is purely conventional. the bottom of the part may as well be regarded as the orientation feature. A change in the orientation freature will only entail a change in configuration of the members for picking-up improperly oriented parts, i.e. identifying and control cams in this orienting apparatus.

In this case, in order to pick-up parts that are not properly oriented from the general flow and to direct them to the reorienting means 8, the edge of the identifying cam 5 is made with the projections 7 and is installed with an inclination towards the control cam 6 (FIGS. 12, 13, 14, 15, 16).

The parts of this configuration are oriented in the following manner.

Properly oriented parts moving along the guide member 4a will move towards the indentifying cam 5. These parts will engage with their bottom plane the projections of the cam without reacting to their presence. However, the inclined position of the identifying cam will cause the parts moving in the vertical direction to slide away from its surface. As a result of disengagement therefrom, the parts will be caused to move horizontally and, guided by the confining member 3b, they will pass by the reorienting means 8 to come in contact with the guide member 4b. The parts will then resume their vertical movement and will be fed by the screw conveyor 1 to a point of discharge.

Unlike the properly oriented parts, a part which is not in a properly oriented position will come in contact with the prejections of the identifying cam 5 with the opposite end thereof so that the projections will engage the inner surface of the opening.

The part retained by the prejectins cannot slide away from the surface of the identifying cam inspite of the inclined position of this cam and will continue to move upwardly to enter the passage 9 of the reorienting means 8.

Further turning of the part, including reciprocation within the passage 9 with a turn at 90° and subsequent joining of the flow of properly oriented parts that have not been subjected to reorientation will occur similarly to the reorientation of parts having a spherical bottom as described above.

Figure 10:
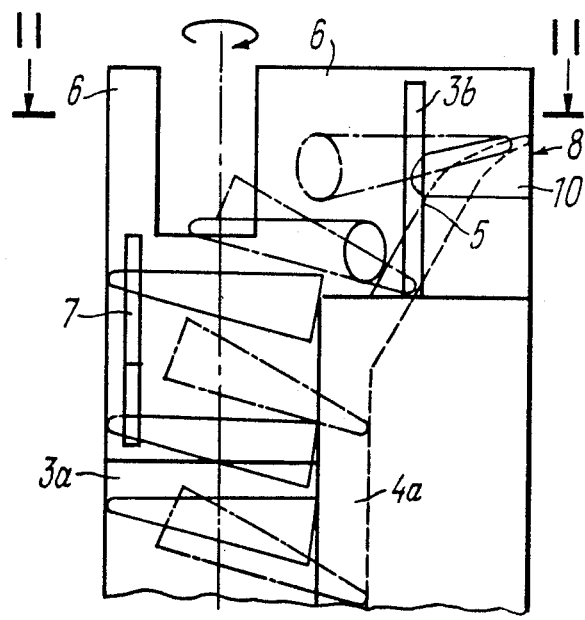
FIG. 10 shows a path of movement of a conical part during orientation.
Figure 11:
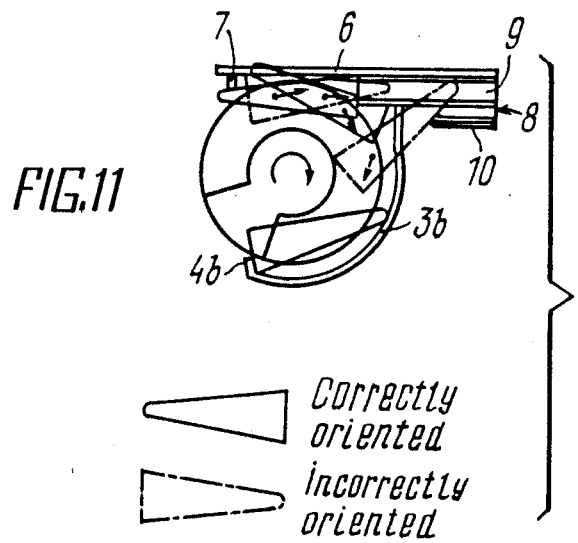
FIG. 11 is a sectional view taken along line 11—11 in FIG. 10.
Figure 12:
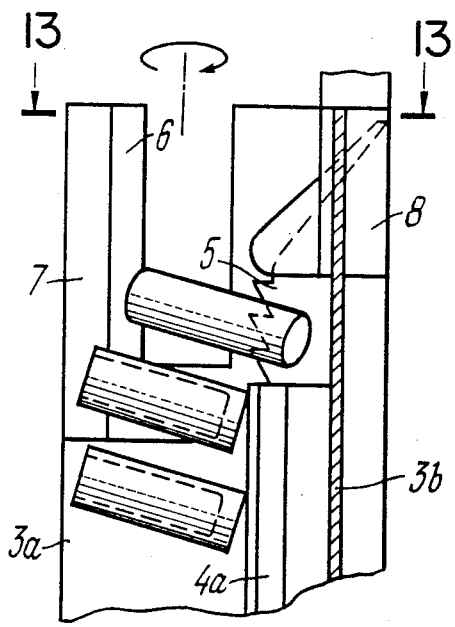
FIG. 12 shows a path of movement of a sleeve-type part with a flat bottom and an opening on the opposite end which is properly oriented.
Figure 14:
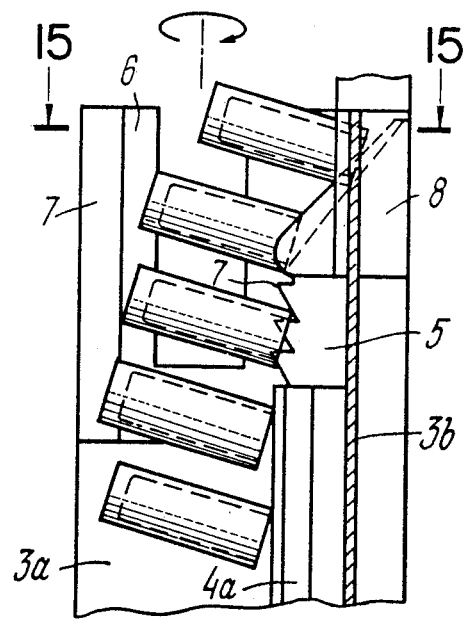
FIG. 14 is a path of movement of a sleevetype part havinga flat bottom and an opening at the opposite end which is improperly oriented.
Figure 13:
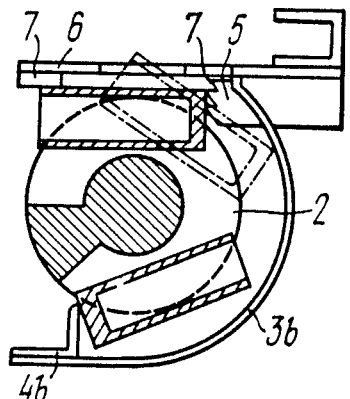
FIG. 13 is a sectional view taken along line 13—13 in FIG. 12.
Figure 15:
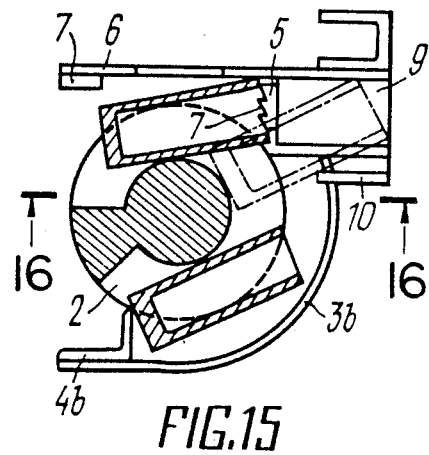
FIG. 15 is a sectional view taken along line 15—15 in FIG. 14.
Figure 16:
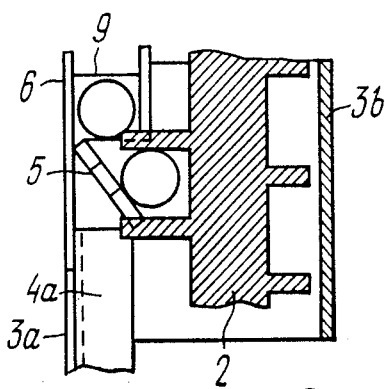
FIG. 16 is a sectional view taken along line 16—16 in FIG. 15 showing division of the flow of parts by means of an identifying cam.
Figure 17:
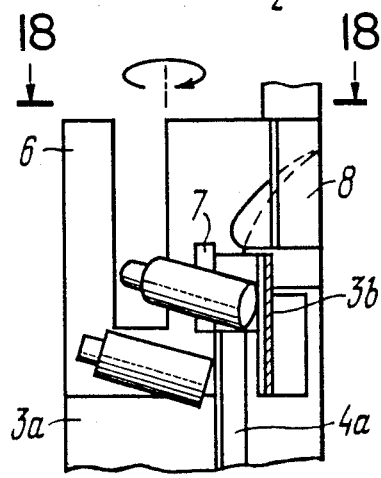
FIG. 17 shows a path of movement of a cylindrical part with different diameters of generant surface which is properly oriented.
Figure 19:
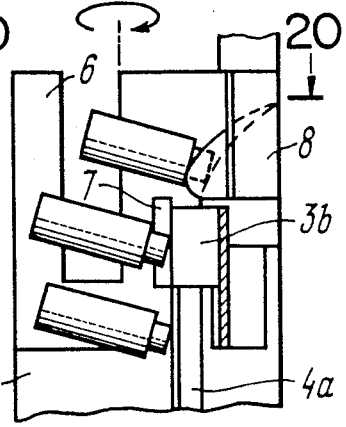
FIG. 19 shows a path of movement of a cylindrical part with different diameters of generant surface which is improperly oriented.
Figure 18:
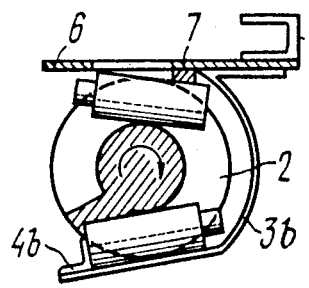
FIG. 18 is a sectional view taken along line 18—18 in FIG. 17f
Figure 20:
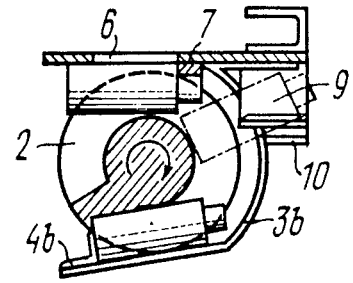
FIG. 20 is a sectional view taken along line 20—20 in FIG. 19.
Figure 21:
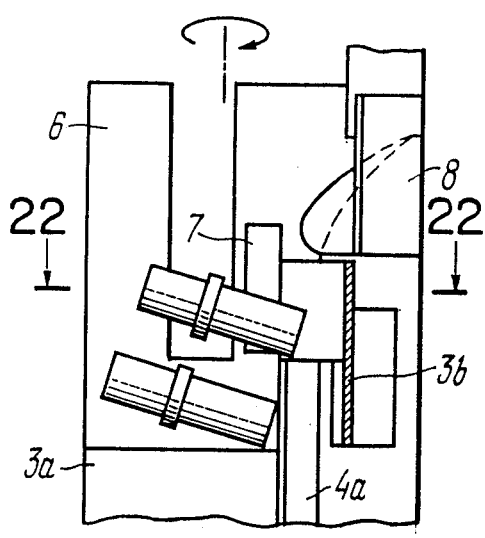
FIG. 21 shows a path of movement of a cylindrical part having a shoulder which is properly oriented.
Figure 23:
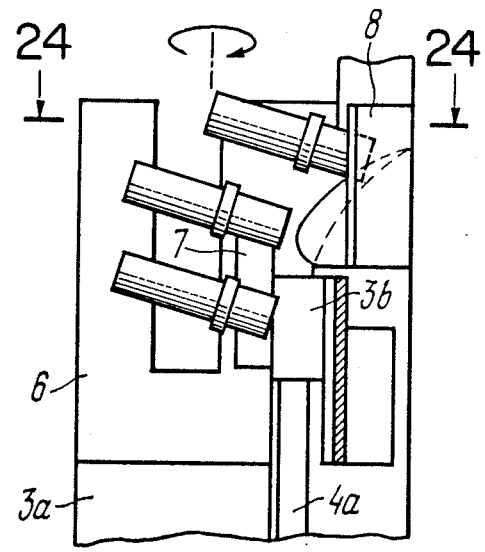
FIG. 23 shows a path of movement of a cylindrical part having a shoulder which is improperly oriented.
Figure 22:
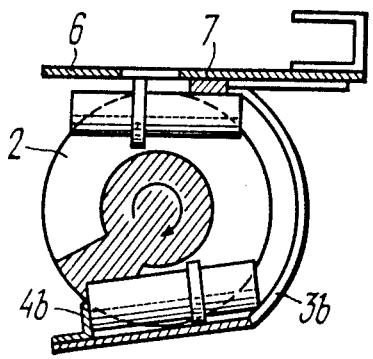
FIG. 22 is a sectional view taken along line 21—21 in FIG. 21.
Figure 24:
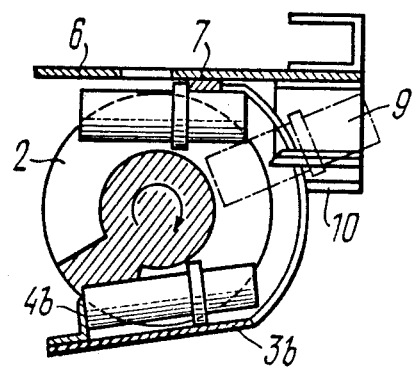
FIG. 24 is a sectional view taken along line 24—24 in FIG. 23.

Parts of conical configuration may also be oriented in the orienting apparatus according to the invention (FIGS. 10, 11).

If the vertex of the cone is taken as orientation feature, one can make the identifying cam 5 with a groove corresponding to the diameter of the cone vertex. The identifying cam 5 is preferably offset with respect to the guide member 4a with the formation of a step.

In this embodiment of the identifying cam, parts which are properly oriented will move to said step with the cone base facing towards this step to slide away from the cam surface and will bypass the groove to move along the confining member 3b until they come in contact with the guide member 4b.

As there is no vertical movement along the surface of the identifying cam 5, the parts will first move below the reorienting means 8 and will then move upwardly along the guide member 4b towards a discharge point bypassing the reorienting means laterally thus moving out of engagement therewith.

An improperly oriented part which moves in the general flow and has its conical portion directed towards the guide member 4a will enter the zone of the identifying cam 5 to have its conical portion received in the groove of said cam. The part will be then retained by this groove against sliding away from the surface of the identifying cam and will move upwardly towards the reorienting means to enter the passage 9 where it is turned into properly oriented position.

Further travel of the oriented part is similar to the described above.

In the above described examples the identifying cam 5 played the dominant part in the process of identification and picking-up of improperly oriented parts. The control cam played an auxiliary part only. This is due to the fact that the orientation features of the parts described above were located in the end zones and were in the form of a spherical or conical portion, opening, and the like.

However, in applications where orientation features are on the generant surface of a part, the prevailing part in indentifying and picking-up misoriented parts is played by the control cam 6.

Let us consider as an example the process of orientation of parts having different diameters of the generant surface (FIGS. 17, 18, 19, 20).

Let us assume that the position of a part facing with its larger diameter portion towards the guide member 4a is the properly oriented position. The reversed position of the part in which it has its smaller diameter portion facing towards said guide member will be regarded as an improper position in which the part has to be turned to the reversed position, i.e. reoriented.

Properly oriented parts will be moved by the screw 2 along the guide member 4a to come to contact with the projection 7 at their larger diameter periphery. When the parts will disengage from the guide member 4a, they will not be retained by the projection so that they will move along the confining member 3b until they come in contact with the guide member 4b thus passing by the reorienting means 8.

A part which is not properly oriented will loose its contact with the guide member 4a and its end at the point of ohange in diameter of the generant surface will be engaged by the projection 7 which will change the path of movement of the part to bring it up to the passage 9 of the reorienting means 8.

Sebsequent turning of the part into the properly oriented position, joinin the flow of parts that have by-passed the reorienting means and further feeding by the screw conveyor to a point of discharge will occur similarly to the abovedescribed processes.

Parts of cylindrical shape having a shoulder on the generant surface are oriented in a similar manner (see FIGS. 21, 22, 23, 24).

In this case the orientation feature is an offset of the shoulder with respect to a plane drawn through the middle of the part, at right angles to its axis.

A step 7 on the surface of the control cam 6 is chosen to correspond to this offset based on the condition that the part will not be engaged by this step at the shoulder thereof in one position (if properly oriented) and will inevitably come in contact therewith if in the reversed position. The part engaged by the step 7 at the shoulder thereof will be picked-up from the general flow and directed to the reorienting means 8. The remaining operations of reorientation will occurs similarly to the abovedescribed embodiments.

It will be apparent from the above examples that the orienting apparatus according to the invention may be used for a large range of parts having distinguishing features of the external surface.

The apparatus according to the invention may be most advantageously used in the mechanical engineering, and more specifically in the metal working industry such as in pressworking, metal working, assembly and other departments.

High sensitivity of the members detecting improperly oriented parts makes it possible to guarantee efficiency of oritentation of parts which have but minor or unremarkable distinguishing features such as chamfer, thread, groove, and the like. This, in turn, allows the range of parts being oriented to be enlarged and makes it possible to introduce automation in new fields.

The self-contained arrangement of the reorienting means means makes it possible to ensure reliable turning of parts into a properly oriented position irrespective of their length and surface configuration.

The combination of reciprocation of the part with its turning allows speed of reorientation to be increased thus enhancing throughput capacity and reliability of the orienting apparatus according to the invention.

What is claimed is:

1. An apparatus for orienting parts in feeding devices of various units, comprising:

a feeding hopper for the parts to be oriented;

a working member in the form of a screw conveyor extending vertically and withdrawing parts from said feeding hopper;

a guide member and a confining member for maintaining the parts in a pre-set position during feeding, which are provided on said working member;

members for picking-up improperly oriented parts and means for reorienting parts located in a gap between said guide and confining members, said guide and confining members being offset downstream from said gap in the direction of movement of said screw conveyor, said picking-up members comprising an identifying cam and a control cam which are mounted as an extension of the guide and confining members in such a manner that the parts being oriented which have an asymmetrical surface configuration with respect to a plane drawn through the middle thereof, at right angles to their axes and which are fed with an improper orientation are engaged by said members and caused to turn into a proper orientation in said reorienting means, and the parts which are properly oriented are caused to pass by said reorienting means.

2. An apparatus according to claim 1, wherein said identifying cam and said control cam have surfaces facing the screw conveyor having projections which are engageable with improperly oriented parts.

3. An apparatus according to claim 1, wherein said reorienting means comprises a passage extending along a tangent line to the surface of the screw conveyor and a guide column adjacent thereto, the dimensions of the space defined between surfaces of the turns of the screw conveyor in the zone of said passage corresponding to the dimensions of the parts being oriented.

* * * * *

UNITED STATES PATENT AND TRADEMARK OFFICE
CERTIFICATE OF CORRECTION

PATENT NO. : 4,844,382
DATED : July 4, 1989
INVENTOR(S) : James D. Raisbeck

It is certified that error appears in the above-identified patent and that said Letters Patent is hereby corrected as shown below:

| | | |
|---|---|---|
| Column 2 | Line 56 | "continuously," should be --continuously curved,-- |
| Column 3 | Line 33 | "attahced" should be --attached-- |
| Column 3 | Line 40 | "Wheninstalled" should be --When installed-- |
| Column 8 | Line 15 | after "said" insert --air-- |

Signed and Sealed this

Twenty-ninth Day of May, 1990

Attest:

HARRY F. MANBECK, JR.

*Attesting Officer*      *Commissioner of Patents and Trademarks*